United States Patent [19]

Reina et al.

[11] Patent Number: 5,729,745
[45] Date of Patent: Mar. 17, 1998

[54] METHODS AND APPARATUS FOR CREATING A BASE CLASS FOR MANIPULATING EXTERNAL DATA CONNECTIONS IN A COMPUTER GENERATED DOCUMENT

[75] Inventors: Cory Alan Reina, Kirkland; Girish Bablani, Issaquah, both of Wash.

[73] Assignee: Microsoft Corporation, Redmond, Wash.

[21] Appl. No.: 339,983

[22] Filed: Nov. 14, 1994

[51] Int. Cl.$^6$ ............................................. G06F 9/44
[52] U.S. Cl. ................................................ 395/683
[58] Field of Search ................................ 395/700, 683

[56] References Cited

U.S. PATENT DOCUMENTS

| | | | |
|---|---|---|---|
| 5,231,577 | 7/1993 | Koss | 395/765 |
| 5,297,284 | 3/1994 | Jones et al. | 395/705 |
| 5,301,268 | 4/1994 | Takeda | 395/680 |
| 5,327,562 | 7/1994 | Adcock | 395/708 |
| 5,386,564 | 1/1995 | Shearer et al. | 395/612 |
| 5,564,044 | 10/1996 | Pratt | 395/676 |

OTHER PUBLICATIONS

Stroustrup, Bjarne, "The C ++ Programming Language", second edition, Addison. Wesley, pp. 191–193, 1991.

Miller, Michael J., "Applications integration:, making your programs work together", PC Magazine, v12, n6, p. 108(13) Mar. 1993.

Davis, Fred, "Operating systems are evolutionary, not revolutionary", PC Week, v8, n20, p. 165(1) May 1991.

*Primary Examiner*—Alvin E. Oberley
*Assistant Examiner*—St. - John Courtenay, III
*Attorney, Agent, or Firm*—Jones & Askew, LLP

[57] ABSTRACT

A method and apparatus for creating a base class and derived classes in an object-oriented computer programming environment that allows an application program to manipulate external data connections in a similar manner. The base class includes sufficient functionality for all external data connections regardless of the protocol of the data transfer mechanism that is utilized for the external data connection such that the specific function calls required from the application to implement each data transfer mechanism is hidden from the application. Thus, the application sees all external data connections as being similar because the application issues function calls only to the base class.

30 Claims, 11 Drawing Sheets

FIG. 2A1

*MATCH LINE TO FIG. 2A2*

APPLICATION: PROJECT

| ID | Name | Duration | Scheduled Start | Scheduled Finish | Predecessors | Resource Name |
|----|------|----------|-----------------|------------------|--------------|---------------|
| 1 | Bob | 4h | 11/25/92 3:00pm | 11/27/92 10:00am | 17 | Painters |
| 2 | Computer room complete | DAY | 11/27/92 10:00am | 11/27/92 10:00am | 18 | |
| 3 | Install warehouse racks | 1d | 11/25/92 1:00pm | 11/26/92 12:00pm | 8 | Day Warehouse Workers |
| 4 | Moving | 9.53d | 11/20/92 10:00am | 12/3/92 4:00pm | | |
| 5 | Move office | 9.53d | 11/20/92 10:00am | 12/3/92 4:00pm | | |
| 6 | Distribute boxes | 3h | 11/20/92 10:00am | 11/20/92 2:00pm | 24SS-5d | Operations Assistant |
| 7 | Disconnect computers | 2h | 11/27/92 10:00am | 11/27/92 12:00pm | 19,14 | Computer Technician |
| 8 | Disassemble furniture | 1d | 11/27/92 11:00am | 11/30/92 11:00am | 24SS-50% | Day Warehouse Workers |

Name: Day Warehouse Workers   Initials: CWW   Max Units: 17   [Previous] [Next]

Costs
Std Rate: $8.00/h    Per Use: $0.00    Base Cal: Standard
Ovt Rate: $12.00/h   Accrue at: Prorated   Group: Warehouse
                                            Code: 301-110

| Project | ID | Task Name | Units | Work | Delay | Scheduled Start | Scheduled Finish |
|---------|----|-----------|-------|------|-------|-----------------|------------------|
| MOVE | 25 | Install warehouse rack | 8 | 64h | 0h | 11/25/92 3:00pm | 11/27/92 10:00am |
| MOVE | 20 | Disassemble furniture | 2 | 16h | 0h | 11/27/92 10:00am | 11/27/92 10:00am |
| MOVE | 25 | Move office furniture/boxes | 10 | 160h | 0h | 11/25/9 21:00pm | 11/26/92 12:00pm |
| MOVE | 27 | Reassemble furniture | 2 | 16h | 0h | 11/20/92 10:00am | 12/3/92 4:00pm |
| MOVE | 30 | Move warehouse | 15 | 600h | 0h | 11/20/92 10:00am | 12/3/92 4:00pm |

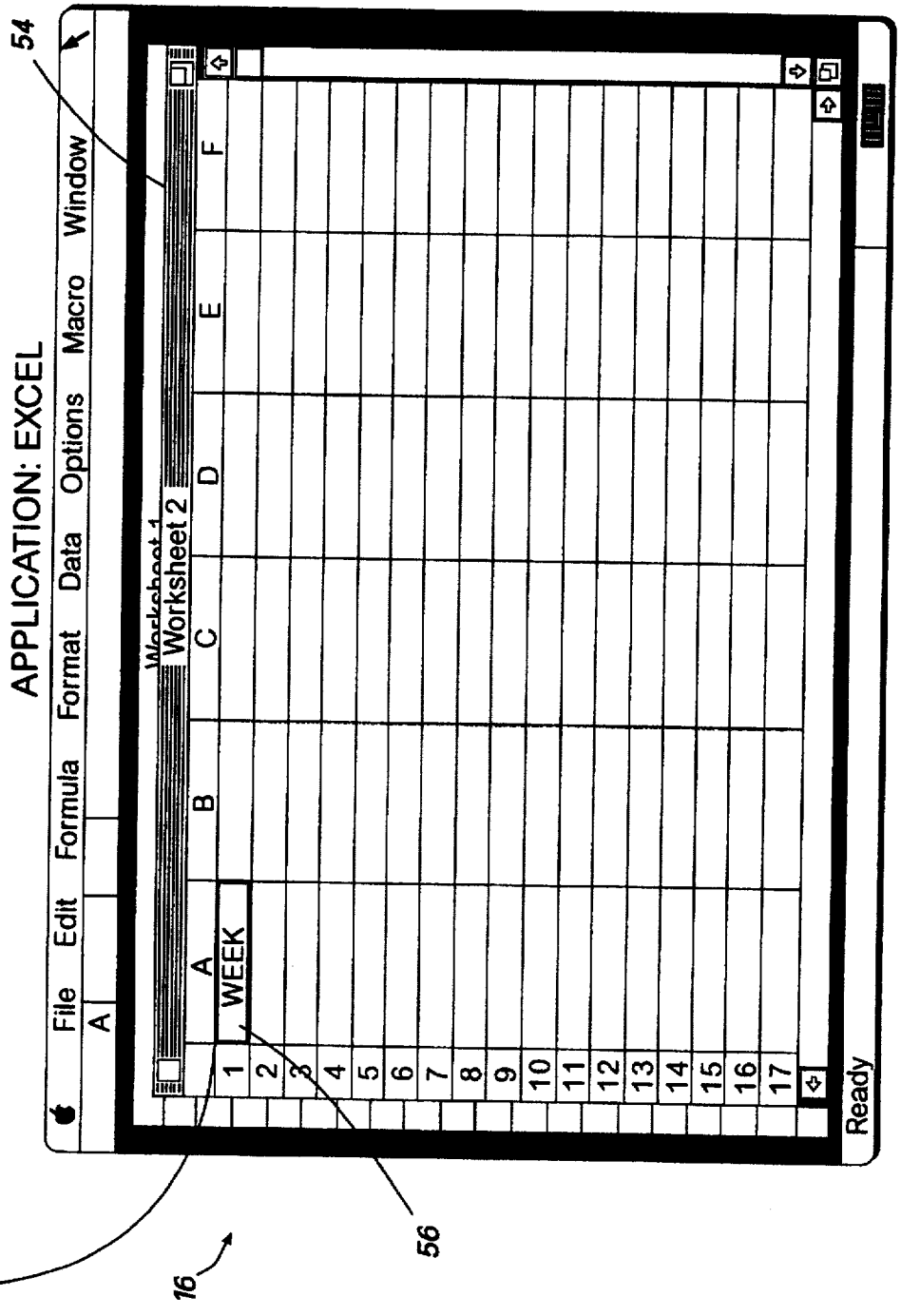
FIG.2A2

MATCH LINE TO FIG. 4B

METHODS AND APPARATUS FOR CREATING A BASE CLASS FOR MANIPULATING EXTERNAL DATA CONNECTIONS IN A COMPUTER GENERATED DOCUMENT

TECHNICAL FIELD

The present invention relates generally to the field of computer systems, and more particularly relates to methods and apparatus for creating a base class in an object-oriented computer programming environment that allows an application program to manipulate different types of external data connections in a similar manner.

BACKGROUND OF THE INVENTION

Some computer system environments allow data from one application program to be integrated with data from another application program in such a way that all of the data appears to a user to be managed by one application. For example, in the Microsoft PROJECT computer program, available from Microsoft Corporation, data in selected regions of the computer program (e.g. cells in the PROJECT spreadsheet) can be linked to data contained in other regions of the program's data file, or to data files associated with other programs on the same computer, or to data files on other computers. Data linked in from the other region is said to be "embedded" in the selected region. When embedded or linked, data from another place is referred to as "source" data and the program used to manipulate the source data is referred to as the server. Consequently, the application to which the source data is moved is called the "client" program because it is a client of the source data maintained by the server.

Data linked into a computer program from other sources is also called an "external data connection." External data connections are those regions of a computer document whose contents either (1) are driven by a data region in another part of the same document or in another document, or (2) drives a data region in another part of the same document or in another document. There are various mechanisms by which data is transferred between servers and clients forming an external data connection. One such data transfer mechanism is object linking and embedding (OLE), manufactured by Microsoft Corporation, assignee of the present invention. OLE defines a protocol for transferring and sharing information by linking data objects across multiple platforms and applications. Details of the OLE system may be found in the OLE 2 Programmer's Reference, published by Microsoft Press, Redmond Washington, the contents of which are incorporated herein by reference and made a part hereof.

OLE allows creation of a "compound" document that incorporates various data objects, sometimes of different formats and from different sources external to the document. When an object is linked to a compound document, the document contains only a reference to the object. Any changes made to the contents of a linked object will be seen in the compound document. When an object is embedded in a compound document, the document contains a copy of the object. Any changes made to the contents of the original object will not be seen in the compound document unless the embedded object is updated.

Another data transfer mechanism is Dynamic Data Exchange (DDE). Data transfer using DDE is initiated by the client. When the connection between the client and server is made, the server develops the formatted data and transfers the data to the client. Both OLE and DDE are used for data transfer in both the WINDOWS™ computer environment, which is available from Microsoft Corporation, and in the Macintosh™ computer environment, which is available from Apple Computer Corporation, Cupertino, Calif.

A data transfer mechanism used on a Macintosh platform is Macintosh publisher and subscriber. The publisher and subscriber are analogous to the server and the client, respectively, as discussed above. New data from the publisher is added to a portion of memory called an "edition". The subscriber is notified by the Macintosh operating system that the data in the edition has changed. The subscriber then determines whether to cause the new data to be transferred from the edition to the subscriber.

The existence of various different types of data transfer mechanisms used in external data connections creates difficulties for computer programmers who often must write a program for one computer environment that must ultimately be "ported" or adapted to operate in another type of computer environment. For example, the Microsoft PROJECT computer program is available in both WINDOWS™ and Macintosh™ versions, and it is desirable that the programs exhibit similar behaviors in each type of environment. However, each different data transfer mechanism uses its own protocol with differing functions to effect the transfer of data, which requires the programmers to create computer program code that handles each type of external data connection. Data transfer mechanisms such as OLE, DDE, and Macintosh publisher and subscriber provide their own interface but must operate within their specific protocols. It is a complex programming task to provide computer program code that efficiently incorporates OLE, DDE, and Macintosh publish and subscribe external data connections.

The use of object-oriented programming techniques can facilitate the development of complex computer programs. Object-oriented programming is a programming technique in which a program is viewed as a collection of discrete objects that are self-contained collections of data structures and routines that interact with other objects and that can be used as a variable in a program. An "object" in OOP terminology is an entity that contains data and an associated set of actions that operate on the data. An object comprises data members and function members that implement the behavior of the object in response to receipt of a "message". When a message is sent to an object, the object invokes a routine that implements that message. These routines are the functions identified by the function members of the object. Functions are sequences of computer programming steps that are carried out in response to a particular message.

Programming languages that support object-oriented techniques have been developed. One such programming language is C++, which is an object-oriented version of the C programming language. In the C++ language, object-oriented techniques are supported through the use of "classes". A class may be thought of as a template for creating objects. A class defines the data structures and routines of an object by describing the data members and the function members of the class. Thus, a class provides a definition for a group of objects with similar properties and common behavior.

A particular object is called an "instance" of a class. To allocate storage in memory for an object of a particular class, an object is instantiated. Once instantiated, data can be assigned to the data members of the particular object. Thus, in this manner, the function members implement the behavior of the object, and the object provides a structure for encapsulating data and behavior into a single entity.

In object-oriented programming, a class is also a descriptive tool used in a program to define a set of attributes or a set of services, available to other parts of the program, that characterize any member of the class. Program classes are comparable in concept to the types of pigeonholes people use to organize information. One familiar example is the categories of lo animal, vegetable, or mineral which define the physical world. Like program classes, such categories define the types of objects they contain and the ways those objects behave.

Two common characteristics of object-oriented programming languages are support for data encapsulation and data type inheritance. Data encapsulation refers to the binding of functions and data. Inheritance refers to the ability to declare a data type in terms of other data types. To support the concept of inheritance, classes may be derived from other classes.

A derived class is a class that inherits the characteristics, i.e., the data members and function members, of its base classes. A class whose characteristics are inherited by another class is called a base class. A derived class may inherit the characteristics of several classes. Thus, a derived class may have several base classes. This is referred to as multiple inheritance. Derived classes can define additional data members and function members not defined in the base class.

A class may specify whether its function members are to be virtually inherited. Declaring that a function member is virtual means that the function can be overridden by a function of the same name and type in a derived class. Thus, an object of a derived class can override functions defined by its parent class, so as to provide different operations in different contexts.

Because of the complexities involved in implementing external data connections with object-oriented programming techniques, a need exists for a simple method for utilizing all data transfer mechanisms in a similar manner regardless of their individual protocols. In particular, a need exists for providing a standard way for one application to transfer data, using different data transfer mechanisms, to and from another application.

What is needed is a method of handling external data connections regardless of type, whether OLE, DDE, or Macintosh publish and subscribe, with a single function call from an application program. Thus, a need exists for a method that provides an interface that allows a single function call to be made for the transfer of data using any one of various data transfer mechanisms. The solution would allow all external data connections to appear to the application program to be similar such that a single function call from the application can effect the transfer of data via an external data connection using any data transfer mechanism.

SUMMARY OF THE INVENTION

Briefly described, the present invention provides methods and apparatus for creating a base class in an object-oriented computer programming environment that allows an application program to manipulate external data connections in a similar manner. The base class includes sufficient functionality for all external data connections regardless of the protocol of the data transfer mechanism that is utilized for the external data connection such that the specific function calls required from the application to implement each data transfer mechanism is hidden from the application. Thus, the application sees all external data connections as being similar because the application issues function calls only to the base class.

The preferred embodiment of the present invention provides for the creation of a base class and five derived classes derived from the base class. The derived classes include function members that implement support for data transfer mechanisms such as OLE, DDE, and Macintosh publisher and subscriber.

More particularly described, the present invention provides methods for transferring data between a first data region in a computer program application and a second data region in a computer program application, utilizing instances of a base class. The method comprises the computer-implemented steps of defining the first data region, and identifying the first data region as containing linked data from an external data connection node. In response to establishment of the external data connection node, creating at least one instance of a base class, the instance having associated data members and function members and corresponding to a predetermined first type of external data connection. The method further comprises defining the second data region and the linked data stored in the second data region, and identifying the second data region as providing linked data. Finally, the method involves transferring the linked data from the second data region to the first data region in response to the application program initiating the execution of corresponding functions associated with the instance of the base class.

Thus, it is an object of the present invention to provide a method and system for providing an interface that allows an application to transfer data using one of several data transfer mechanisms via a single function call.

It is another object of the present invention to provide a method and system for creating a base class that includes function members common to various data transfer mechanisms.

It is a further object of the present invention to provide a method and system for creating a derived class, for each data transfer mechanism, from the base class that includes additional function members in accordance with the respective data transfer mechanism.

Other objects, features, and advantages of the present invention will become apparent upon reading the following specification, when taken in conjunction with the drawings and the appended claims.

DETAILED DESCRIPTION OF THE PREFERRED EMBODIMENT

Turning next to the figures, in which like numerals indicate like elements throughout the several figures, the preferred embodiment will now be described in detail. In general, the disclosed embodiment provides an improved method for allowing an application to implement external data connections of various different types utilizing an object-oriented programming (OOP) programming environment.

Figure 1:
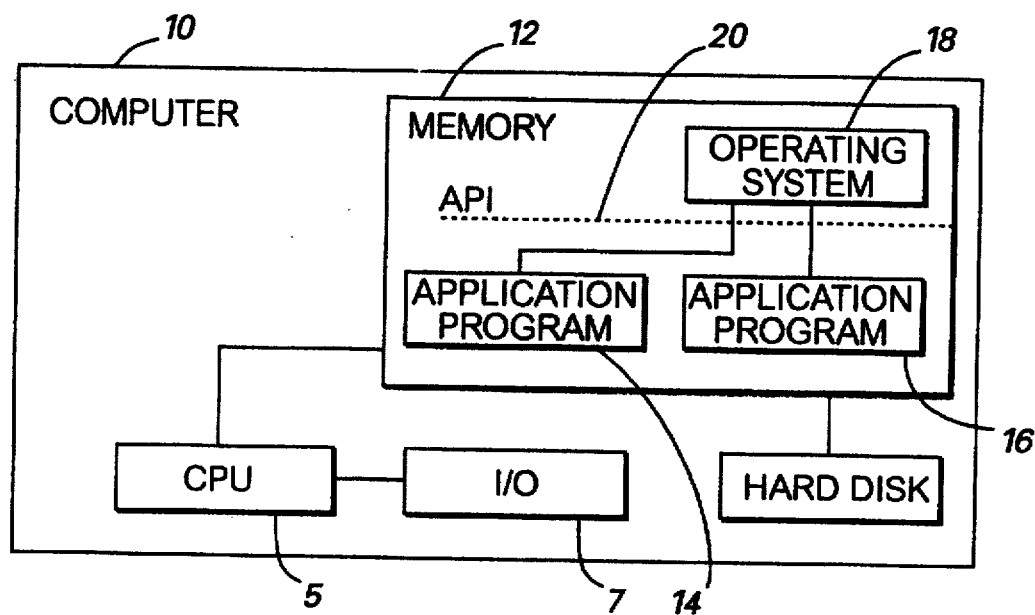
FIG. 1 is a diagram of a computing system on which the present invention is implemented.

As shown in FIG. 1, the present invention is implemented in connection with a computing device, generally shown at 10. The computing device 10 includes a central processing unit (CPU) 5, an input/output (I/O) controller 7 to manage communications between the CPU and a display screen user interface. The computing device 10 also includes an internal memory 12, within which is stored an operating system computer program 18, which is programmed to control the operations of the computer by managing the allocation and usage of hardware resources such as memory, central processing unit (CPU) time, and data storage space. Also included in the memory 12 is at least one, and preferably several, application programs 14, 16, each of which enable the user to perform certain tasks. The programming required to implement the method of the present invention preferably forms a part of the application program interface (API) 20, which defines the various messages and responses passed between the operating system 18 and application programs 14, 16.

In accordance with the invention, methods and systems are provided for implementing an external data connection by creating instances of a base class, for example data from a region in the application program 16 is embedded in a region of the application program 14. FIG. 2A shows an example of the graphical depiction of such an external data connection. The data "DAY" stored in a cell 52 of a document 50 created by an application program 14, e.g. PROJECT 4.0, is shown. The data "DAY" stored in a cell 56 of another document 54 of another application program 16, e.g. Microsoft EXCEL, is also shown. When the data in cell 52 is to be replaced by the data in cell 56, the connection between the two locations is called an external data connection. The document 54 is termed the server and the document 50 is termed the client. The mechanism by which data is transferred is associated with the external data connection and is remembered by the interface. The document 50 may have numerous other external data connections with numerous other documents created by other applications.

The present invention allows an application program to receive data from another application program, or from another region of the same application program via a standard data transfer mechanism comprising an external data connection. This mechanism is preferably implemented by providing function calls in the API 20 to work with the particular data transfer protocol associated with a particular type of external data connection. The preferred embodiment is implemented in a C++ base class that includes sufficient functions to support common types of external data connections, including OLE client, OLE server, DDE client, DDE server, Macintosh publisher, and Macintosh subscriber. For computers using the WINDOWS™ and Macintosh™ operating systems, the C++ base class supports both OLE and DDE protocols for external data connections. For Macintosh computers, the C++ base class supports additionally the Macintosh publisher and subscriber protocols for external data connections. It should be understood that the present invention can be implemented using other programming languages other than C++. However, the use of C++ is preferred because of the inherent advantages obtained using this object-oriented programming language.

As described earlier, external data connections refer to those regions of a document whose contents either are driven by a data region in another document or another part of the same document, or whose contents drives a data region in another part of the same document or another document. External data connections may be classified by their data transfer mechanism.

There exists various data transfer mechanisms and protocols that are well known by those skilled in the art. Among the data transfer mechanisms are DDE, OLE, Macintosh publishing and Macintosh subscribing. The protocols and programming necessary to implement these data transfer mechanism are well known in the art and are not the subject of the present invention. These data transfer mechanisms each include various functions that allow data to be transferred between regions in a document or between different documents. The functions included in each data transfer mechanism are not necessarily identical. Thus, different data transfer mechanisms may require different functions be carried out in order to effect the transfer of data. For example, the functions required for data transfer in accordance with OLE can be found in the referentially incorporated OLE 2 Programmer's Reference. External data connections are thus classified according to their data transfer mechanism. For example, an external data connection that uses OLE as the data transfer mechanism is classified as an OLE type connection.

External data connections may be further classified or typed by their direction of data transfer. An external data connection whose data is driven by another region of data is referred to as a client. Conversely, an external data connection whose data drives another region of data is classified as a server.

External data connections may be classified using both their type of data transfer mechanism and the direction of data flow. Thus, a region of a document whose contents are driven by another region using OLE is classified an OLE client. It should be understood that the data transfer mechanisms listed above can be listed in six different classifications. These classifications include: OLE client, OLE server, DDE client, DDE server, Macintosh publisher, and Macintosh subscriber.

There are other characteristics of the different types of data transfer mechanisms. A "cold" connection is one where no notification is given to the client from the server when data has changed. Thus, the client must explicitly request the new data for a transfer to occur. DDE, OLE, and Macintosh publisher and subscriber all support cold connections. A "warm" connection is one where notification is given to the client from the server when the serving document is saved. Macintosh publisher and subscriber is currently the only transfer mechanism to support warm connections. Finally, a "hot" connection is one where notification is given to the client from the server immediately when data has changed. DDE and OLE are the only transfer mechanisms that support hot connections.

It should also be understood that each of the above-referenced data transfer mechanisms require specific functions for implementation, and that not all functions for implementation of different data transfer mechanisms are identical.

Thus, an external data connection is a channel of communication that permits one application to communicate with another application. Data is transferred in various ways according to various protocols depending on the platform. For WINDOWS and Macintosh based environments, DDE and OLE are used as data transfer mechanisms. These data transfer mechanisms physically transfer data from one application to another.

For Macintosh environments, Macintosh publisher and subscriber are used as data transfer mechanisms. These data transfer mechanisms are well known to those skilled in the art. This data transfer mechanism transfers information, yet the data resides permanently in a separate file on a disk in the computer. The Macintosh publisher and subscriber data transfer mechanism transfer data by placing new data in an external file called an "edition", which the Macintosh operating system supports. The publisher generates the new data and places it in the edition. The subscriber is then notified by the Macintosh operating system that a change exists. The subscriber can then request that the changes in the edition be transferred to the subscriber.

For a DDE data transfer mechanism, the client initiates the connection with the server to effect the transfer of data. When the DDE client establishes a connection with a DDE server, the client notifies the server whether it wants data to be transferred when the data changes. For an OLE data transfer mechanism, the client initiates the connection with the server to effect the transfer of data.

The establishment of a connection or a corresponding disconnection between a client and server is performed by a function call initiated within an application program. The function calls for performing these and other functions are different for each different data transfer mechanism.

The present invention simplifies the work required by an application program in incorporating various types of external data connections into the application. The method provides a C++ base class that includes functions common to all OLE, DDE, Macintosh publishing and Macintosh subscribing external data connections. Therefore, the method allows an application to access all external data connections by accessing the base class. Because the base class includes functions common to all data transfer mechanisms of each external data connection, all external data connections are viewed similarly by the application. Thus, the application need not include additional programming to handle all of the different types of external data connections.

The function calls common to all data transfer mechanisms, in accordance with the present invention, are listed in Table 1 below.

TABLE 1

1. WORD CEDL::GetStatus( )—returns the status of the CEDL node.
Possible values are:
EDLS_NEW—implies that the CEDL was just created but not fully initialized
EDLS_OPEN—implies that the CEDL is open and prepared for calls
EDLS_CLOSED—implies that the CEDL is no longer prepared for calls
EDLS_DELETED—implies that the CEDL has been deleted, but the
delete has not been committed
2. CEDL::SetStatus (Word edls)—sets the status of the CEDL node.
Possible values of edls are specified in CEDL::GetStatus( )
3. CEDL::GetFlags( )—returns the set of all flags associated with a CEDL.
Logical OR-ing of any of the following:
EDLF_SAMEAPPINST—implies server and client are same app instance
EDLF_SAMEDOC—implies server and client are in same document
EDLF_CLIENT—implies this is a client connection
EDLF_SERVER—implies this is a server connection
EDLF_DATAADVISE—implies that server provides only non-graphical data
EDLF_PICTADVISE—implies that server provides only graphical data
EDLF_PERMANENT—implies that CEDL has been persistently stored
EDLF_AUTOMATIC—implies that updates are done automatically
EDLF_UPDATEONCHANGE—implies that updates should be done on a data change
EDLF_UPDATEONSAVE—implies that updates should be done on doc save
EDLF_DIRTY—implies that CEDL has changed since last save
EDLF_ISLINK—implies that CEDL is not embedded
EDLF_EXTENTCHANGED—implies that CEDL's associated picture has changed and should be redrawn
EDLF_STATIC—implies that CEDL's associated picture never changes
EDLF_ICONIC—implies that a CEDL should be shown iconic in the UI
EDLF_MONIKERASSIGNED—implies that a CEDL has had a name associated with it
EDLF_RECOMPOSEONRESIZE—implies that a server should be requested to emit another picture if the CEDL is resized in the UI
EDLF_PRINTDIRTY—implies that an object's printed version should be requested before trying to print the CEDL
EDLF_DOSETEXTENT—implies that a client CEDL should notify its server application of an extent change the next time it runs the application
4. DWORD CEDL::SetFlags (Dword edlf)—allows an application to set one or many flags. Possible values are described in CEDL::GetFlags( )
5. WORD CEDL::GetLinkType ( )—returns the type of data connection.
Possible values are:
EDLT_CDDE—DDE client external data connection
EDLT_CPL—OLE client external data connection
EDLT_CSEL—OLE/DDE server external data connection
EDLT_CSUB—Macintosh subscriber external data connection EDLT_CPUB—Macintosh publisher external data connection 6. WORD CEDL::GetLinkPlatform( )—returns the platforms upon which this data type is fully supported. Logical OR-ing of any of the following:
   EDLP_ALL—all platforms fully support this link type
   EDLP_WIN—link type is fully supported under Windows
   EDLP_MAC—link type is fully supported under Macintosh 7. RESET CEDL::QueryInterface (REFIID riid,LPVOID FAR*ppvObj), ULONG CEDL: :AddRef( ) and ULONG CEDL::Release( ) provide OLE interface access support. It is assumed that each derived class will provide support for each of these three functions.

8. void Delete( ), void Undelete( ) and void Commit Delete( ) provide a mechanism for supporting deletion and Undo of deletion in the user interface. An application should call CommitDelete( ) when it has determined that the deletion of a CEDL has been committed, e.g., when it's undo buffer gets cleared.

9. Bool CEDL::Read( ) and Bool CEDL::Write( ) provide methods for persistent storage.

10. Bool CEDL::CopyToClipboard( ) provides a method for the CEDL to place zero, one or many formats on the clipboard.

11. Bool CEDL::Open( ) should be called by an application immediately for each CEDL which has been read in from persistent storage, but before any CEDL has had any other methods called on it.

12. void CEDL::Close( ) should be called by an application for each CEDL within a document when a document is closed.

13. CEDL::GetLinkTypeName (Bool fFullName,LPSTR lpsz,WORD cchMax) returns a human-readable string describing the link type (e.g., "DDE").

14. CEDL::GetLinkUserTypeName(Bool fFullName, LPSTR lpsz,WORD cchMax) returns a human-readable string describing the link user type name (e.g., "Spreadsheet").

15. CEDL::GetLinkSourceName (Bool fFtfilName,LPSTR lpsz,WORD cchMax) returns a human-readable string which, for client nodes, specifies the full name of the source data whose data is driving the client. Some servers (e.g., publishers) will actually respond to this method; in response, they will return the name of the sink into which they store their data. In the case of a publisher, the name of the edition fie would be returned.

16. CEDL::GetLinkSinkName (Bool fFullName,LPSTR lpsz,WORD cchMax) returns a human-readable string which, for client nodes, describes the region within a document which is driven by data. Some servers (e.g., publishers) may respond to this method; in response they should return the name of the data region within a document from which data is being taken.

17. Bool CEDL::Renamed( ) should be called for each CEDL within a document whenever the containing document is renamed. A client CEDL will notify its server of the name change. A server CEDL will notify all connect clients of the name change.

18. Bool CEDL::Saved( ) should be called for each CEDL within a document whenever the containing document is saved.

19. Bool CEDL::GetData (CFMT cfmt, HDTA*hdta) is supported by all servers. It allows an application to fetch data in any non-picture format from a server.

20. Bool CEDL::SetData (CFMT cfmt, HDTA hdta) is supported by all clients. It allows an application to set dam of any non-picture format into a client.

21. Bool CEDL::Update( ) is supported by all clients and servers. It allows an application to force any client or server to update its internal data to the most recently available value as possible.

22. Bool CEDL::DoVerb (LONG lVerb) is supported by all servers and clients. It allows an application to execute any verb associated with it.

23. void CEDL::ComputeDisplayRect (RECT*lpr) is supported by all clients. It allows an application to determine the screen size in which a picture CEDL prefers to be displayed.

24. void CEDL::SetExtent (LPSIZEL lpsizel) is supported by all clients. It allows an application to change the size associated with a picture CEDL. Some clients may notify their servers of the extent change, others may not.

25. Long CEDL::GetHeight (WORD edlw) returns the height in appropriate units of a picture CEDL. Possible values of edlw are:
    EDLW_PIXELS—returns height in screen pixels
    EDLW_HIMETRIC—returns height in 1/100 cm units
    EDLW_TWIPS—returns height in 1/1440 in units 26. Long CEDL::GetWidth (WORD edlw) returns the width in appropriate units of a picture CEDL. Possible values of edlw are described in CEDL::GetHeight.

27. void CEDL::Draw (RECT*lpr) is supported by all clients. It allows an application to draw a client to screen.

28. void CEDL::PrtDraw (RECT*lpr) is supported by all picture CEDL clients. It allows an application to draw a CEDL client to the printer.

29. Bool CEDL::Track ( . . . ) is supported by all picture CEDL clients. It allows an application to ask the CEDL what cursor is to be shown as the cursor is dragged over the CEDL in the application.

30. Bool CEDL::FillVerbMenu ( . . . ) is supported by all CEDL nodes. It fills the specified menu up with human-readable strings and commands. This menu can be used in the user interface of an application to allow the user to choose which verb of a CEDL is to be executed.

31. Bool CEDL::SetLinkSourceName (LPSTR lpszSource) is supported by all CEDL clients. It allows the application to change the name of the source associated with the CEDL. This routine should only be called for CEDL nodes for which the EDLF_CLIENT and EDLF_ISLINK bits axe set.

32. CEDL::Get Property Ptr (WORD propId, WORD propType, BYTE*lpbData, DWORD lcbDataMax, DWORD*lplcbDataAct). It allows an application to fetch any information to a CEDL-instance which is persistently associated with it.

33. CEDL::PutPropertyPtr (WORD propId, WORD propType, BYTE*lpbData, DWORD lcbData). It allows an application to add any information to a CEDL-instance which should be persistently associated with it.

After the discussion which follows, in connection with a specific example, those skilled in the art will be enabled to prepare computer program code that implements these function calls to allow creation and management of external data links, via creation of instances of a CEDL base class constructed in accordance with the present invention.

Table 1 represents the function calls associated with the CEDL base class. This base class supports data transfers. The CEDL base class includes data members and function members common to all data transfer mechanisms associated with all external data connections. Therefore, it is seen that the function members comprise thirty-three functions. The application program may issue a function call for these functions to initiate the transfer of data as required. Once the application issues a function call, additional programming in the interface determines which object of the appropriate derived class should be used to execute the data transfer. The selection of the derived class is determined by the type of external data connection being utilized for the transfer of data.

The functions listed in Table 1 are the functions for the base class for an application program PROJECT 4.0, developed by Microsoft Corporation. It should be understood that the scope of the present invention is not limited to any particular application, but can be implemented for any application.

The present invention provides an application programming interface (API) that provides a base class including specific functionality such that the application can establish a connection with any external data connection, regardless of the protocol of its associated data transfer mechanism, by a single function call. Thus, one type of function call can establish a connection with various different types of external data connections. The API must also operate with all user interface requirements, such as maintaining the name of the server, the name of the client, and the type of external data mechanism used for each connection.

The interface saves, in persistent storage, information surrounding each external data connection. So, for each document of an application, all information regarding each data connection within each document is saved to a disk. Thus, the interface knows about the external data connections in each document.

Within physical storage for each client is stored the name of the server to which the client is connected as well as a description of the data that is connected. Each type of external data connection stores this information. Thus, this information is common to all types of external data connections. Differences between the connections exist in the manner of describing the server. For each server, the only information stored is a description of the data that is connected. This follows because a server can have multiple clients, while each client can have only one server.

The present method provides a base class that provides sufficient functionality for all external data connections regardless of protocol such that the specific function calls required to implement each external data connection is hidden from the application. Thus, the application sees all external data connections as being similar because the application issues function calls only to the base class. The present method therefore simplifies the programming required for the application.

Figure 3:
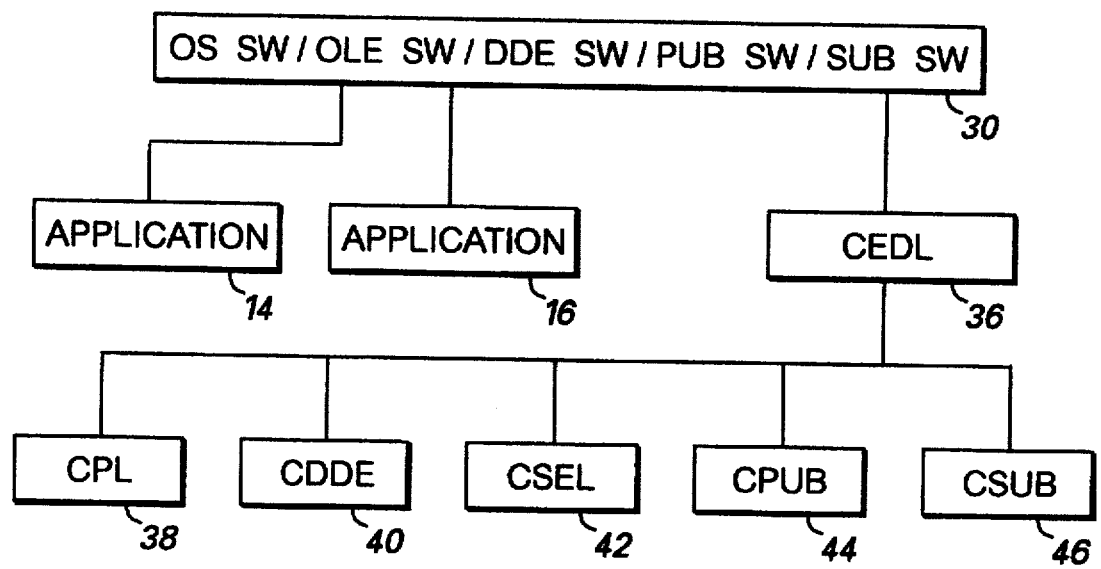
FIG. 3 is a table illustrating a hierarchy of object classes utilized in constructing a computer program in accordance with the present invention.

The preferred embodiment of the present invention provides for the creation of a C++ base class and several derived classes derived from the base class. FIG. 3 illustrates the exemplary classes and derived classes and the relationships therebetween that are provided to implement the present invention. Discussion will not be provided of classes that are shown as the operating system and the applications programs. It should be understood that the operating system object coordinates the resources of the computer system and receives messages from various underlying objects. The operating system object passes messages back and forth between objects as necessary and appropriate.

As shown in FIG. 3, the operating system and programming required to implement OLE, DDE, and Macintosh publisher and subscriber are stored in the memory of the computer is represented by object 30. The application programs 14, 16 are represented as objects that implement methods for a particular user purpose or application. For the purposes of this description of the present invention, one application program 14 is PROJECT and the other application program 16 is EXCEL, both created by Microsoft Corporation. The base class CEDL (C External Data Link) that is the subject of the present invention is identified at 36. Preferably, several derived classes are created from the base class. The derived classes include CPL 38 which implements OLE client support, CDDE 40 which implements DDE client support, CSEL 42 which implements both OLE server and DDE server support, CPUB 44 which implements Macintosh publisher support, and CSUB 46 which implements Macintosh subscriber support.

It will be understood that each creation of a link from a region of one document to another region (in the same document or elsewhere) involves the instantiation of a member of one of the derived classes from the CEDL base class 36. Each instantiation of a derived class is termed a CEDL-type node. Each object derived from the base class, i.e., each external data connection, is thus a CEDL-type node. The application program can treat any object derived from the base class as a CEDL-type node. This greatly simplifies the work required by the application in managing the various types of external data connections because the application can view each external data connection as one type, i.e., the type represented by the CEDL-type node.

It will be further understood that the base class CEDL 36 is not instantiated, and does no work. The application makes a function call to the base class, yet the actual function calls to the external data connection to be used is made by the appropriate object instance of the derived class. From the view of the application, it sees only the base class.

Any instance of the CEDL base class 36 includes data members and function members. The functions included in the base class are those functions that are common to all external data connections. Thus, the functions of the base class are analogous to the least common denominator of each object of the derived class. Thus, the base class includes all functions that are common to all objects of all derived classes.

The different functions of each external data connection are added to the objects in the corresponding derived class. Thus, because a derived class inherits all functions of its base class, all functions of the derived class are provided, but only those common to all data transfer mechanisms are included in the base class.

Thus, each client is associated with the data that is changed. Also to be remembered is which object will change when a corresponding server is changed. The server must remember the entire context of a change of data. Not only must the server remember the characteristics of the actual changed data, but the server must also remember what particular cells are changing within a document (assuming the document includes discrete cells provided by the application). By contrast, the client need only remember what cells are changing.

The present invention provides an API that visualizes, or hides, the specific function calls needed for implementation of the different types of data connection. Thus, the interface allows the differences between data transfer mechanisms of the different external data connections to be hidden from the application, thus greatly simplifying the requirements of the application. The interface identifies the standard functionality that each type of external data connection provides.

Figure 2B:
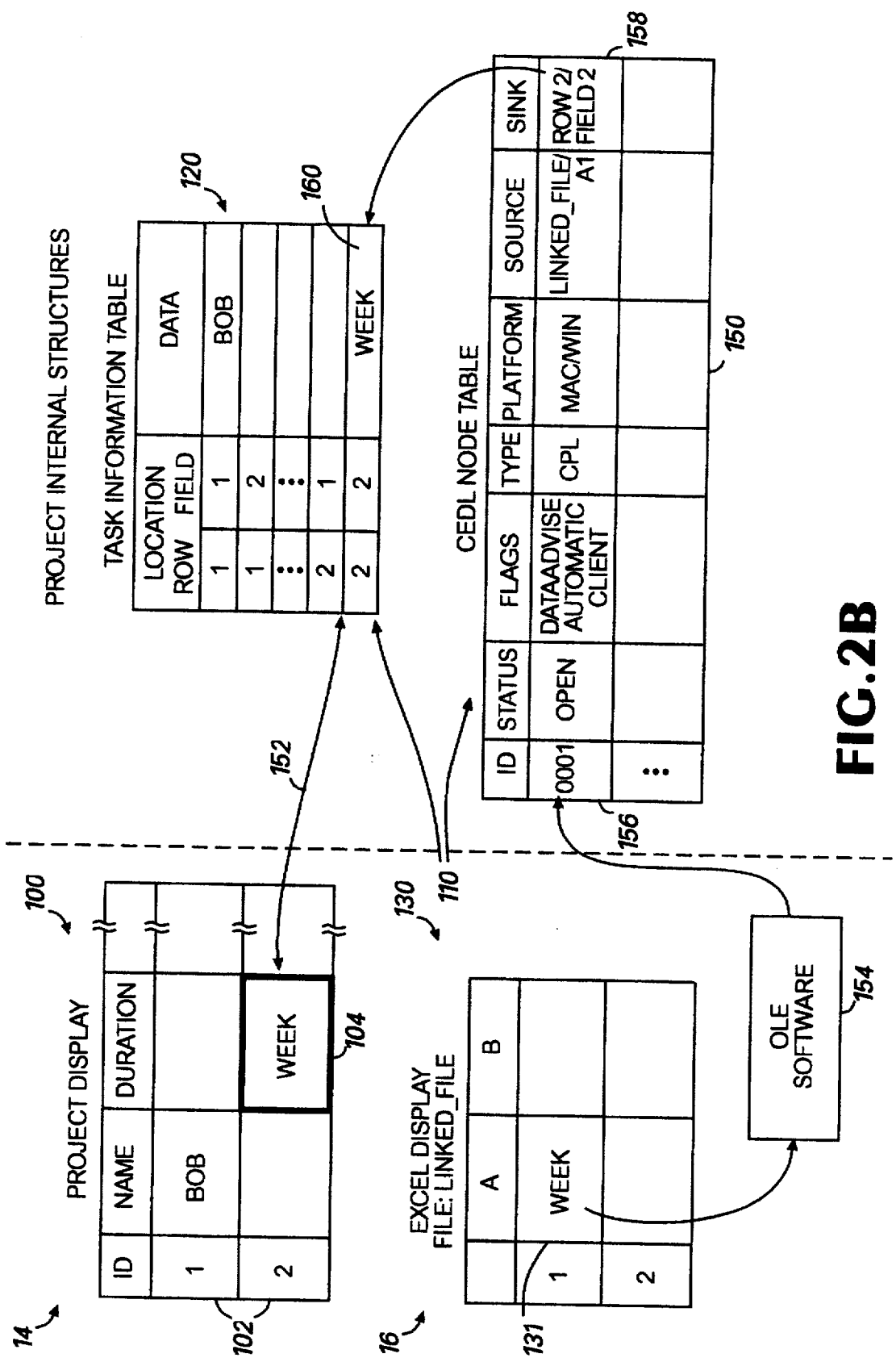
FIG. 2, consisting of FIG. 2A and FIG. 2B, illustrates an exemplary computer application program(s) that are linked with an external data connection and internal data tables of one exemplary application program, illustrating the principles of the invention.

FIG. 2B shows displays and data structures required to implement the data transfer mechanisms in accordance with the preferred embodiment of the present invention. For purposes of this example, FIG. 2B shows the use of the PROJECT application program 14 and the EXCEL application program 16, both developed by Microsoft corporation. In this example, the highlighted cell 104 is driven by the data in a cell located at column A, row 1 of the EXCEL spreadsheet 16. Thus, an external data connection exists between the PROJECT program and the EXCEL program.

A display generated by the PROJECT application program is shown at 100. The display includes cells for displaying data. Each cell is identified by a particular row and field number. Row numbers are sequentially numbered, shown at 102, and the fields are identified as NAME, DURATION, etc.

Another application program display is shown at 130. In this example, an EXCEL Spreadsheet Display shows the word "WEEK" located in cell 131, located at column A, row 1 of the spreadsheet.

Each region of the PROJECT document displayed at 100 that is driven by another document is called an external data connection. In this example, the cell 104 in PROJECT and the cell 131 in the EXCEL spreadsheet form an external data connection.

Data structures maintained in the computer by PROJECT are shown generally at 110. A Project Task Information Table is shown at 120. This Information Table stores the data to be displayed and the location of the data. For example, the word "BOB" is stored in the Table and its location is identified as row 1, field 1. As seen in the display 100, this location corresponds to the first cell underneath the NAME field. Similarly, the word WEEK is identified as being located at row 2, field 2. This corresponds to its location in cell 104 in display 100. A pointer 152 is provided between the entries in the Task Information Table 120 and the corresponding cells in the display 100 of the PROJECT application program to identify the proper data to be displayed. When the cell 104 is displayed on the computer's display, programming code associated with the PROJECT application program retrieves data from the Task Information Table 120.

Every region of a document driven by another region of the same document or another document is termed a node. Nodes are simply a way of mapping data from external sources into the Task Information Table 120 such that the external data will be placed in the proper location. Information about each node within a document is stored in CEDL Node Table 150, maintained by the PROJECT application program. The CEDL Node Table 150 identifies the location within the PROJECT document of all nodes.

As seen from FIG. 2B, the CEDL Node Table maintains an entry for each different node in a document. The first entry in the CEDL Node Table thus provides information on the first node in the document. The information maintained by each entry in the CEDL Node Table includes the following data fields: an ID field (e.g. a unique identifier indicative of the location of the node), a STATUS field indicative of the status of the node, a number of FLAGS associated with the node, a TYPE field indicative of a type of external data connection, a PLATFORM field indicative of which type of computer environment is supported, a SOURCE field (e.g. the file name of a server and the location within the server document of the connected data), and a SINK field (e.g. the location within the client document of the connected data).

The possible entries for several categories of the above-referenced information are described in Table 1. The STATUS field of the node includes possible values of new, open, closed, and deleted. The FLAGS that may be set in the CEDL Node Table are numerous, and include whether the server and client are located in the same document, whether the connection is a client or a server connection, whether the updates to the document are performed automatically, or whether the updates are performed when the document is saved. Other flags may also be set that provide information regarding the node.

The type of external data connection is maintained in the TYPE field of the CEDL Node Table 150. As previously discussed, the types of external data connections include DDE client, OLE client, OLE/DDE server, Macintosh publisher, and Macintosh subscriber. The PLATFORM, i.e., whether the application program is running in a Windows or Macintosh environment, is also maintained in the CEDL Node Table.

The data and cell location in the server document that provides data to the client document is provided to the data transfer mechanism software. In this example, the data in cell 131 in the EXCEL Display 130 is provided to the OLE software 154, which is associated with the operating system 18 (FIG. 1). This OLE software 154 functions to effect the transfer of data from the server (e.g. the cell 131 in the EXCEL application) to the client (e.g. cell 104) in accordance with the OLE protocol. The OLE software provides a pointer to the entry in the CEDL Node Table 150 for the node with which the server is connected. In this example, the node is identified as Node ID 0001, as seen at 156. The CEDL Node Table maintains a link with the client document by having a pointer that links the SINK field entry 158 with the corresponding entry in the Task Information Table 160.

Figure 4A:
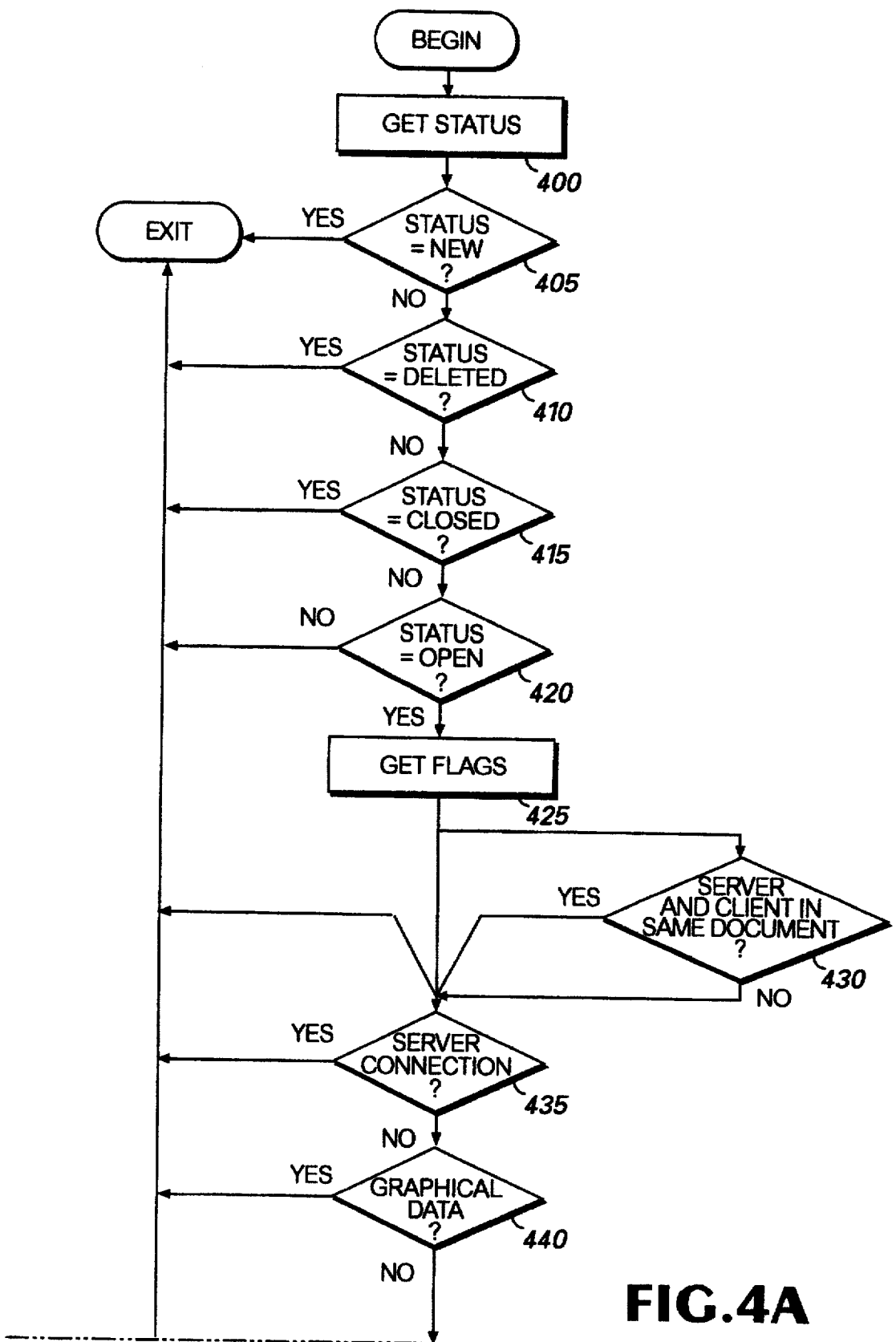
FIG. 4 is a flow diagram illustrating utilization of an exemplary external data link object.
Figure 4B:
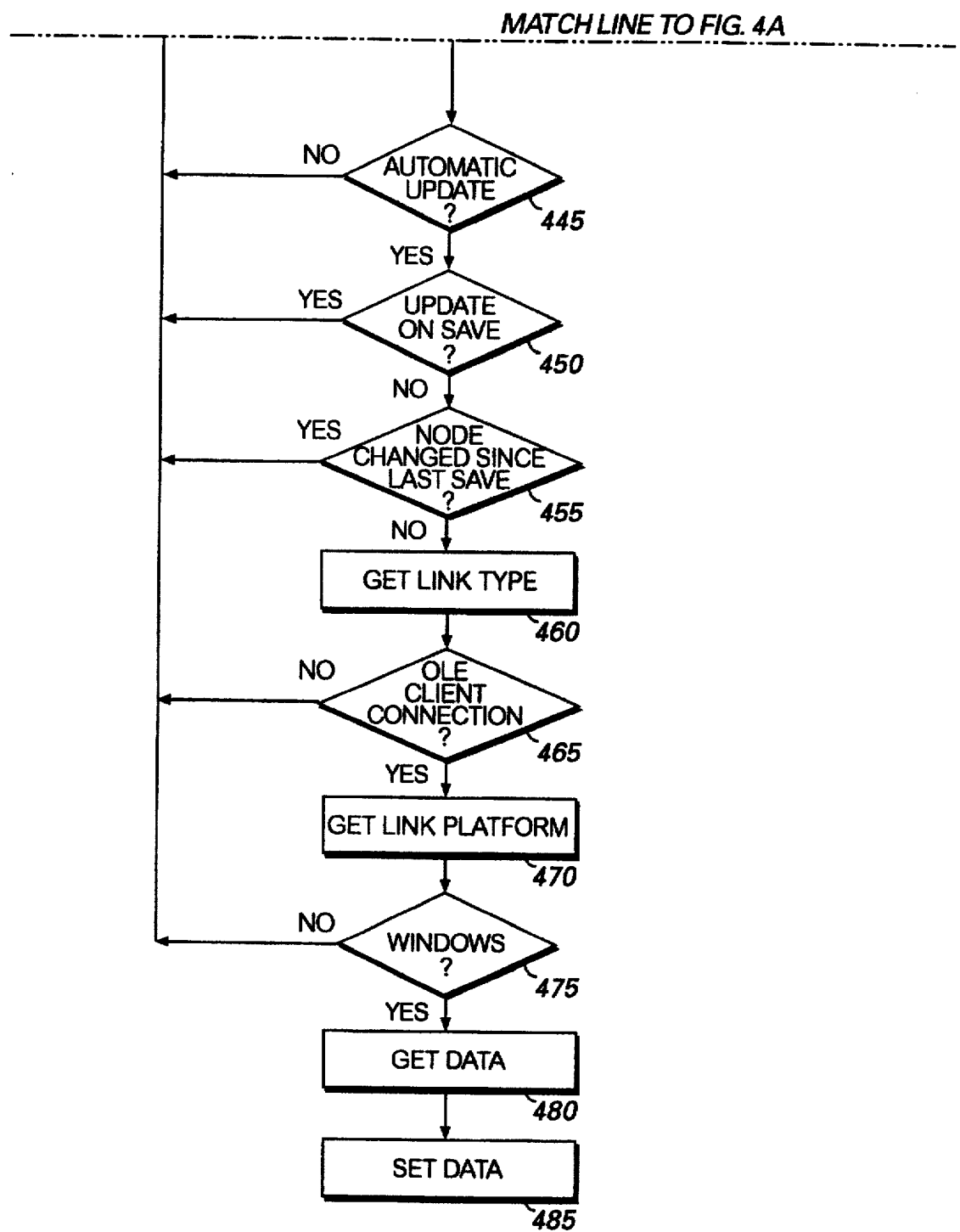

The method by which data is transferred from a server to a client via an external data connection is shown in the example described by FIG. 4. The steps shown in FIG. 4 comprise computer program steps implemented within an application program such as the PROJECT application program 14. In particular, the steps relate to utilization of a previously-created external data link object, i.e. an instance of a CEDL object, at an appropriate point within the execution of the application program when an external data link function is to be carried out. Program code associated with the previously-created external data link object responds to the function calls or messages passed to a selected object.

It should be understood that this example describes the transfer of non-picture data to a client from a server that is in a different application and/or document or a different region in a document associated with the client. In this example, the client is operating in a WINDOWS™-based environment. The data transfer mechanism for this example is OLE, and the external data connection is deemed a hot connection.

The method of FIG. 4 begins at step 400. It should be understood that this method defines a specific example in which information surrounding a node is assumed to be of a certain content. Many other examples for nodes having different information associated therewith can be generated, and the method of the present invention is not limited to data transfer operations specified by this example.

At step 400, the application issues a GetStatus function call. The call is implemented by scanning through the Status field of the CEDL Node Table 150 for the appropriate Node ID. If the stabs is new, deleted, or closed, as determined by steps 405, 410, and 415, respectively, the process follows the respective "no" branch and the routine returns control to the calling routine. If the status is neither new, deleted, or closed, the method proceeds to step 420, where it is determined whether the status is new. If so, the method follows the "yes" branch to step 425. If the status is not open, the method process via the "no" branch and exits the routine of FIG. 4.

At step 425, a GetFlags function call is made. The flags set within the CEDL Node Table are examined to determine which flags are set. For this example, it is determined whether the server and client are in the same document at step 430. This is determined by examining the SAMEAPPINST flag to determine if the server and client are the same application instance and the SAMEDOC flag to determine whether the server and client are located within the same document within an application. Because our example uses a client and a server in different applications, the method exits the routine via the "yes" branch if either of the flags are set. If neither of the flags are set, the method proceeds to step 435.

Step 435 determines whether the connection is a client or server connection by examining the client and server flags. If the server flag is set, then the connection is a server connection and the method exits the routine via the "no" branch. If the client flag is set, then the connection is a client connection and the method proceeds to step 440.

Step 440 determines whether the data to be transferred is graphical data. The DATAADVISE and PICTADVISE flags are examined. If the PICTADVISE flag is set, the data is graphical data and the method exits the routine via the "yes" branch. If the DATAADVISE flag is set, then the server is supplied only non-graphical data. Thus, the method follows "no" branch to step 445.

Step 445 determines whether the client is to be updated with changed data from the server automatically upon the change of the data, rather than upon a specific request from the user. This is determined by examining the AUTOMATIC flag. If the flag is set, the method follow the "yes" branch to step 450. If the flag is not set, the method exits the routine via the "no" branch.

At step 450, it is determined whether the update of client data should be performed when the client document is saved. Because our example updates data automatically, this UPDATEONSAVE flag, if set, would cause the routine to exit via the "yes" branch. If the flag is not set, the method proceeds to step 455.

At step 455, the DIRTY flag is examined to determine if the data has been changed since the last save operation. If so, the flag is set and the routine exits via the "yes" branch. If the flag is not set, the method proceeds to step 460.

At step 460, a GetLinkType function call is made. The type of the external data connection is determined by examining the entry in this field. The entry can be one of five possible values: CDDE identifying the link as a DDE client connection, CPL identifying the link as an OLE client connection, CSEL identifying the link as OLE/DDE server connection, CSUB identifying the link as a Macintosh subscriber connection, and CPUB identifying the link as Macintosh publisher connection. In our example, the external data connection is an OLE client connection, so the entry in the field will be CPL. Any other entry in the table causes the method to exit the routine. If the entry is CPL, the method proceeds via "yes" branch to step 470.

At step 470, a GetLinkPlatform function call is made to determine the environment in which the external data link is operating. The possible values of this entry include ALL, which identifies that the link type is supported by all platforms, WIN, which identifies that the link type is supported by a WINDOWS-based environment, and MAC, identifying that the link type is supported by a Macintosh environment. At step 475, the value of the entry is examined. In this example, the connection is in a WINDOWS-based environment, so the value returned will be WIN. Any other value causes the method to exit the routine via the "no" branch. If the value returned at step 475 is WIN, the method proceeds to step 480.

At step 480, a GetData function call is issued. This causes the changed data in the server to be obtained by the application. All servers support this function. Thus, the GetData function call fetches the data in the server. The method then proceeds to step 485, where a SetData function call is made. The SetData function call allows an application to set non-picture data into a client. Thus, this function stores the changed data in the Task Information Table, e.g. table 160 maintained by the PROJECT application program 14 in the example being described.

Thus, the method of FIG. 4 describes the function calls required to effect a transfer of data from a server to a client. The function calls provided by the instantiation of the base class of the present invention are independent of the particular type of data transfer mechanism used by the external data connection. The base class of the present invention thus provides functionality that supports all types of external data connections.

Figure 5:
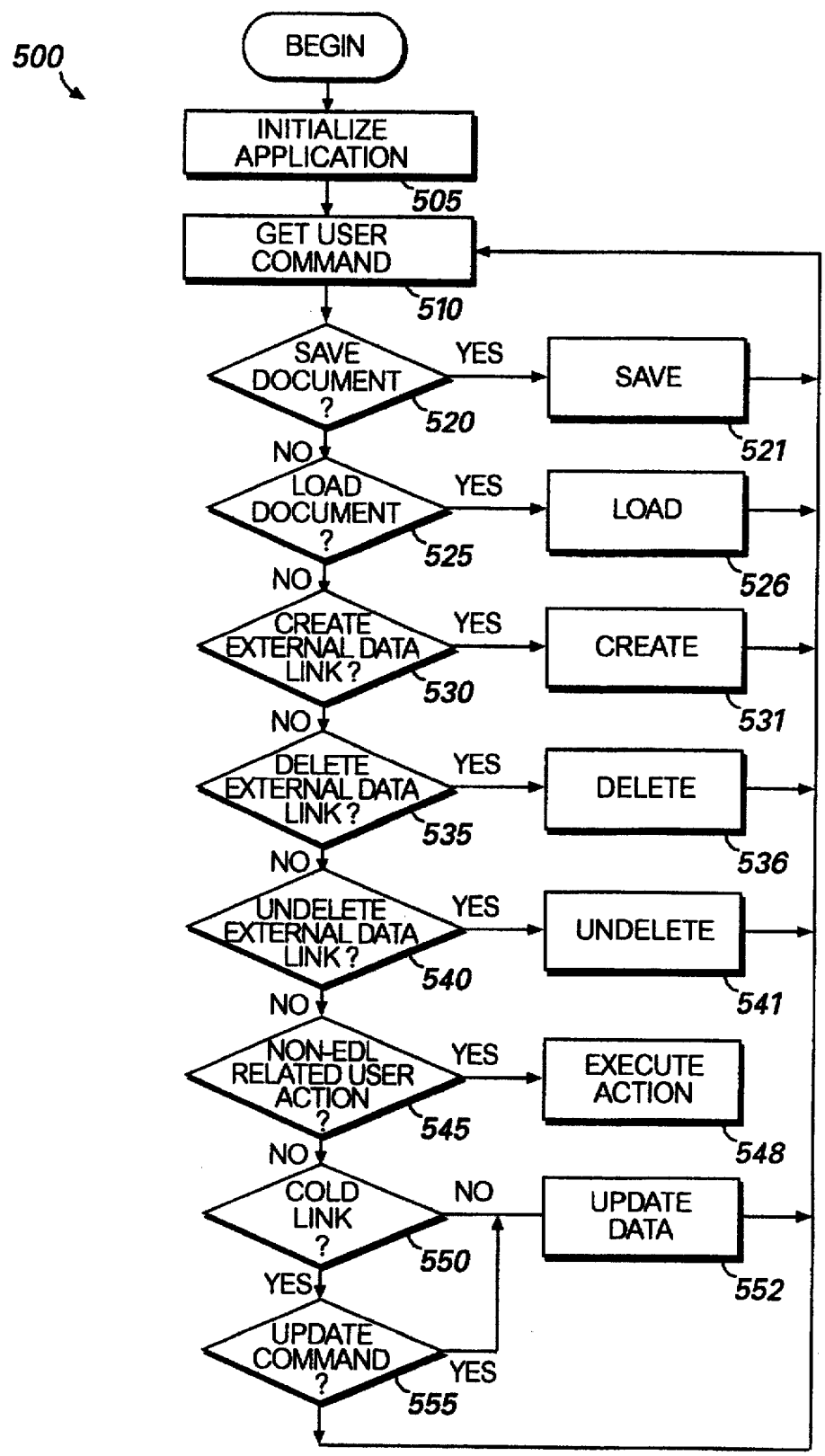
FIG. 5 is a flow diagram of the overall functional operation of an exemplary computer application program that utilizes the present invention.

Turning next to FIG. 5, it will be recalled that the preferred embodiment of the present invention provides a base class that provides sufficient functionality such that all external data connections provide support for various functions. The process by which various exemplary functions are implemented in shown in FIG. 5, in connection with the overall functional operation of an exemplary computer application program that utilizes the present invention. These functions are carded out to create external data link nodes (i.e. instances of the base class), delete them, undelete them, save documents that contain external data link nodes, and load documents that contain external data link nodes. The steps shown in FIG. 5 comprise computer program steps carded out by an application program such as the PROJECT application program in order to support the various tables as shown in FIG. 2B.

The process is shown generally at 500. Whenever the system is first activated, the application program is initialized at step 505. The initialization procedure is performed by a separate routine, well known to those skilled in the art. Control passes to step 510, where the application accepts a user command entered by an input device on the computer. When a user command is detected, the process passes to step 520, where it is determined whether the user command was to save the document. If so, the process follows the "yes" branch to step 521, where the save command is carried out. As described in greater detail below, the save command incorporates steps to update any external data links and save the document. The method then returns to step 510 to await further user commands.

If no save document command has been detected, the process follows the "no" branch to step 525. Control passes to steps 525, 530, 535, and 540 to determine whether the user has issued a command to load a document, or create, delete, or undelete an external data connection, respectively. If one of these commands has been issued by the user, the method branches to routines for loading, creating, deleting, or undeleting as required at steps 526, 531, 536, and 541. After carrying out these commands, control returns to step 510 to await further user input.

If none of the above discussed user commands have been detected, control passes to step 545, where it is determined whether any commands not related to external data connection within the document have been detected. If so, the command is executed at step 548. If no such commands have been detected, controls passes to step 550.

It is determined at step 550 whether the external data connection is a cold link, meaning that the client must explicitly request that changed data be transferred. In a cold data connection, the server will not notify the client that data has changed. If the data connection is not cold, i.e., the data connection is hot, the server automatically transfers the changed data to the client. Thus, at step 552 the data is updated by and control returns to step 510.

If at step 550 the data connection is determined to be cold, the process proceeds via the "yes" branch to step 555, where it is determined whether the user has issued an "update link" command, indicating that the data is to be updated. If so, the process follows the "yes" branch and control passes to step 552, for execution of the update. If no update command has been issued, control returns to step 510, where the system waits to detect a subsequent user command. Because the data connection was determined to be cold, the update step 555 is required because the client must explicitly request the server to transfer changed data, which only occurs in response to a user command.

Figures 6, 7:
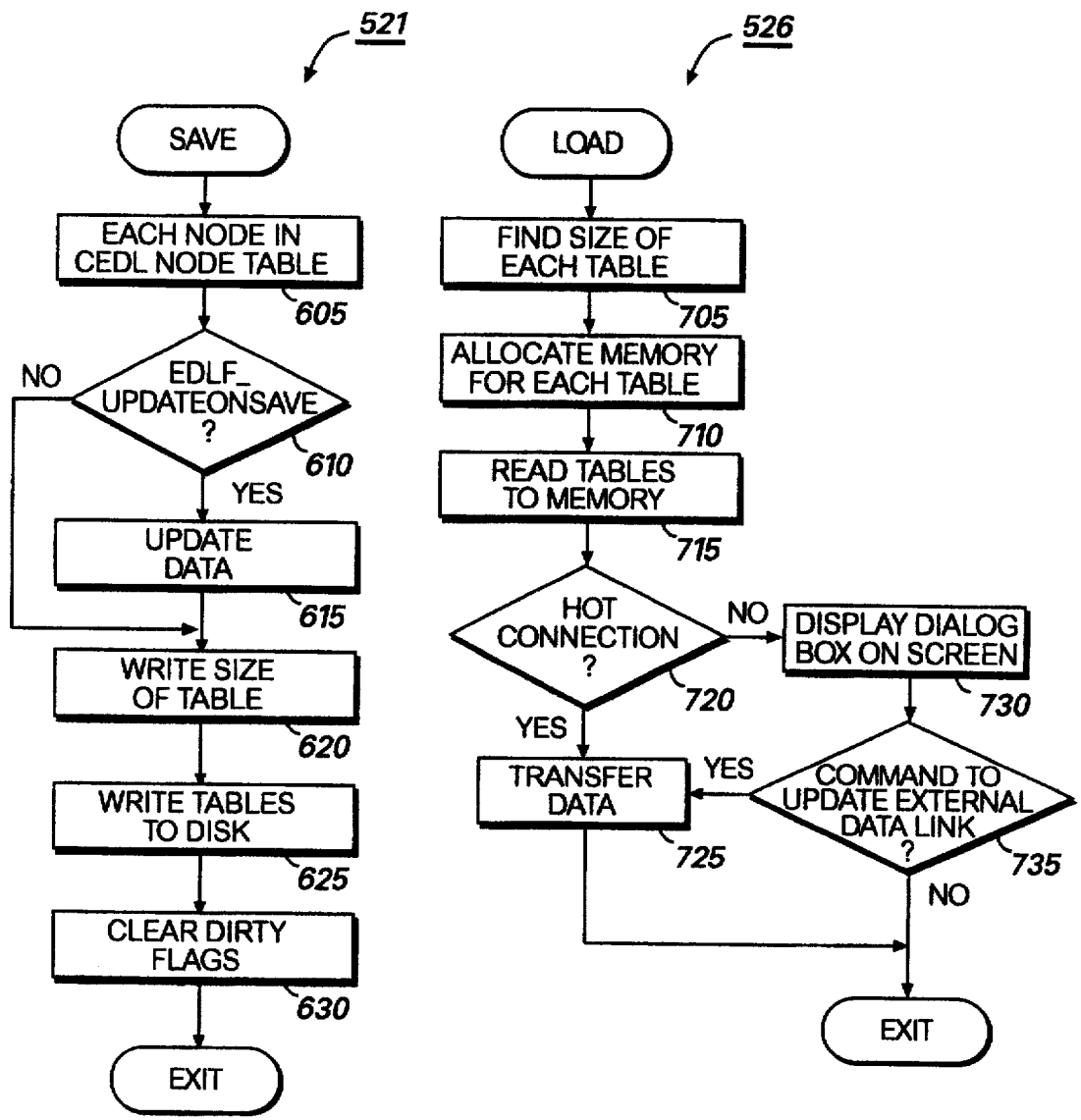
FIG. 6 is a flow diagram of a routine invoked to save a file in accordance with the present invention.
FIG. 7 is a flow diagram of a routine invoked to load a filed in accordance with the present invention.

The save routine, shown at 521 in FIG. 5, is further described in FIG. 6. It should be understood that the routine used to implement the save function 521 is comprised of the steps shown in FIG. 6. When the user issues a save command, control passes to step 605, where the CEDL Node Table 150 is traversed to examine the flags in each data entry for each node in the document. As discussed above, the flags provide information regarding various facets of the node. If at step 610 the EDLF_UPDATEONSAVE flag is set, the "yes" branch is taken and the external data link associated with the node is updated at step 615 by retrieving data from the server and storing it in the appropriate location in the Task Information Table 120. Control then passes to step 620.

If on the other hand the EDLF_UPDATEONSAVE flag is not set at step 610 for a selected data entry in the CEDL Note Table, the data currently existing in the Task Information Table 160 associated with that entry need not be updated and control passes to step 620.

At step 620, the size of the tables (e.g. the CEDL Node Table 150, the Task Information Table 120, and any other data associated with the document) is written to disk, followed by the writing of the contents of the tables to disk, at step 625. The tables written to disk include those tables maintained within PROJECT, as shown in FIG. 2B After the tables have been written to disk, any flags identifying the node as having changed since the last save function (e.g. the EDLF_DIRTY flag associated with that node) are then cleared. Clearing the dirty flags is necessary as the executed save function necessarily means that the node is no longer changed.

The load routine, shown at step 526 of FIG. 5, is further described in FIG. 7. The load routine is carried out to retrieve (e.g. from disk storage) a stored document or data file associated with the application program being executed, and load that document or data file in the computer's memory so that it can be displayed, manipulated, printed, etc. The load routine begins at step 705, where the size of each data structure associated with the stored filed is identified. Typically, this entails examining a predetermined header portion of the data file retrieved from storage to determine how much memory needs to be allocated for each data table (e.g. the CEDL Node Table 150, the Task Information Table 120, and any other data associated with the document). At step 710, sufficient memory is allocated in memory 12 for each table.

Control then passes to step 715, where the contents of each table are read from disk into memory. Thereafter, the data connections of each node in the document are connected to the appropriate servers.

If the data connection of a node is a hot connection, as determined at step 720, the method follows the "yes" branch to step 725, where changed data from the server is immediately transferred to the client. If the data connection is not hot, then control passes to step 730. Data transferred via a data connection that is not hot, i.e., a cold connection, must be initiated by the client as the server will not notify the client of changed data. Thus, control passes to step 730 via the "no" branch.

Step 730 displays a dialog box on the display screen of the computer, typically asking the user whether any external data connections should be updated and providing a command mechanism (e.g. a clickable button) for responding yes or no. The user responds to the dialog box at step 735, where it is determined whether the user has input a command to update external data links. If so, the process follows the "yes" branch to step 725, where data in the Task Information Table 120 is updated. Typically, this entails traversing the CEDL Node Table 150 and identifying each location in the Task Information Table that is associated with an external data link (as indicated in the SINK field), and retrieving the corresponding data from the associated linked file or other source (as indicated in the SOURCE field). If the user does not issue a command to transfer data, the process follows the "no" branch from step 735 and exits.

The creation of new external data connections is implemented via routine 531 of FIG. 5. This routine is further described in FIG. 6, which begins at step 815. At step 815, sufficient memory is allocated to store entries associated with the new external data link in the CEDL Node Table 150, identified in FIG. 2B. The method then proceeds to step 820, where it is determined whether there is already an entry in the CEDL Node Table for the particular external data link. If an entry exists, the method follows the "yes" branch to step 822. At step 822, the EDLF_DIRTY flag for the selected node is set, to indicate that changes are being made to data associated with the document. Control then passes to step 825.

At step 825, the GetStatus function call is made to determine the status of the node. The method then proceeds to step 855.

If CEDL Node Table does not contain an entry for a node, the method follows the "no" branch to step 830, where an entry is created in the CEDL Node Table for the newly created node. The method then proceeds to step 835 where the CEDL Node ID is incremented by one such that subsequent nodes will be given a different identifier. The method then proceeds to step 855.

At step 855, the method determines whether the status of the node executed by the GetStatus call of step 825 has been returned. If the status has not been returned, the method follows the "no" branch to step 860, where an error messages is displayed to the user and the method exits the routine. If the appropriate status has been returned, the method follows the "yes" branch to step 870, where data corresponding to the various fields for the node (e.g. ID, FLAGS, STATUS, TYPE, PLATFORM, SOURCE, SINK, etc.) is stored in the CEDL Node Table for that node.

Figure 8:
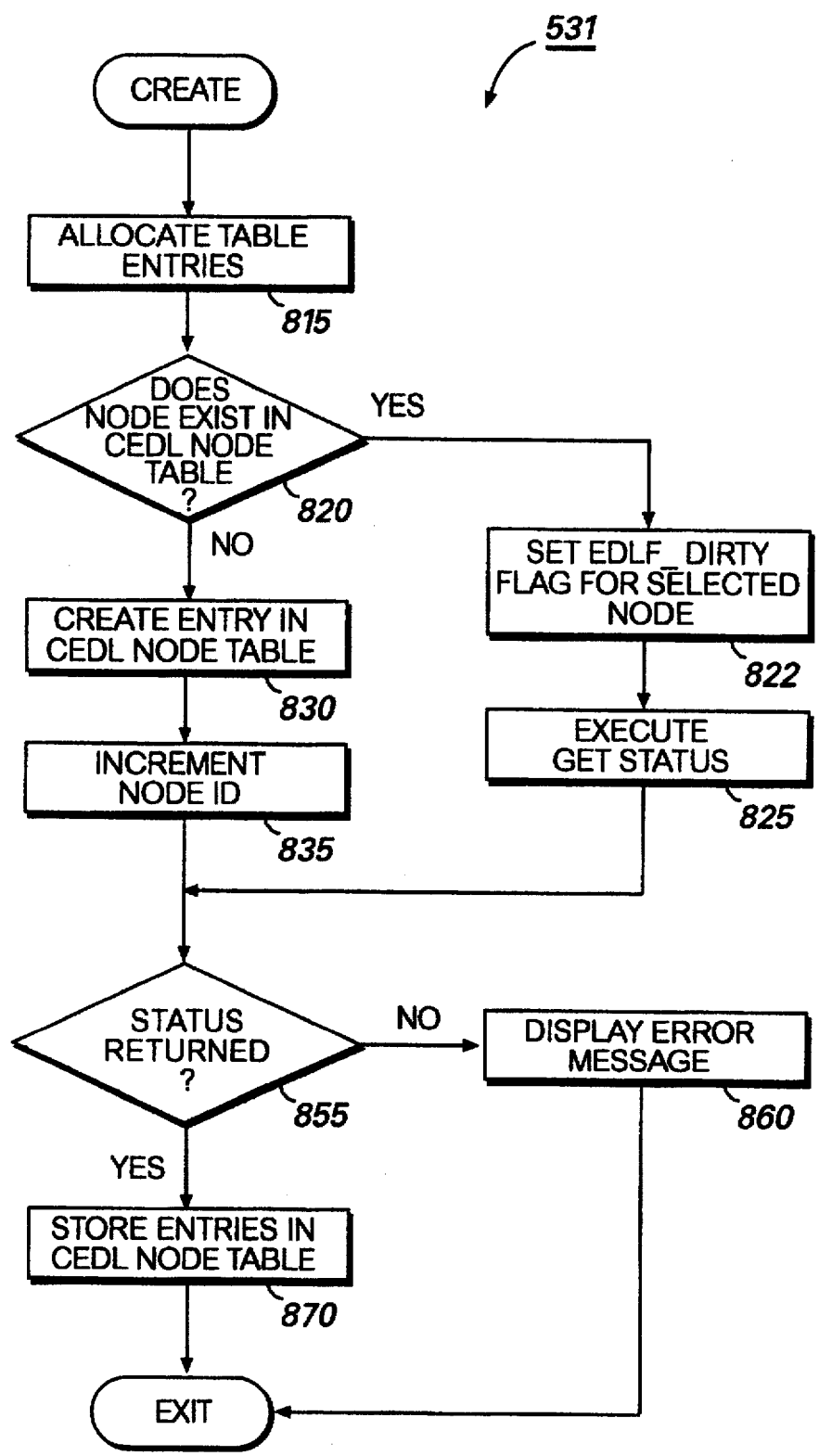
FIG. 8 is a flow diagram of a routine invoked to create an external data link in accordance with the present invention.

It will be understood and appreciated that the steps indicated in FIG. 8 have several effects. First, the EDLF_DIRTY flag is set to indicate that changes are underway with respect to this particular node. Thus, if for some reason other computer processes interrupt the execution, the EDLF_DIRTY flag will indicate that change has been made.

Second, if a node does not already exist in the CEDL Node Table 150, then a new entry must be created in the table, with flags and indicators set appropriately for the status of the node, the corresponding SOURCE and SINK field entries must be determined, etc.

Third, if a node already exists in the CEDL Node Table 150, there is no need to create a duplicate entry for that node, but there is a need to create a new entry, but there is a need to indicate that a new external data link is now being associated with that particular node. For example, if the user is selecting a new cell in the PROJECT spreadsheet 14 for linking to another cell in the EXCEL spreadsheet 16, then the corresponding SOURCE field associated with the node needs to indicate which predetermined cell in the EXCEL spreadsheet has been selected, and the SINK field associated with the node needs to indicate which predetermined location in the Task Information Table to which the predetermined cell in the EXCEL spreadsheet corresponds.

Figures 9, 10:
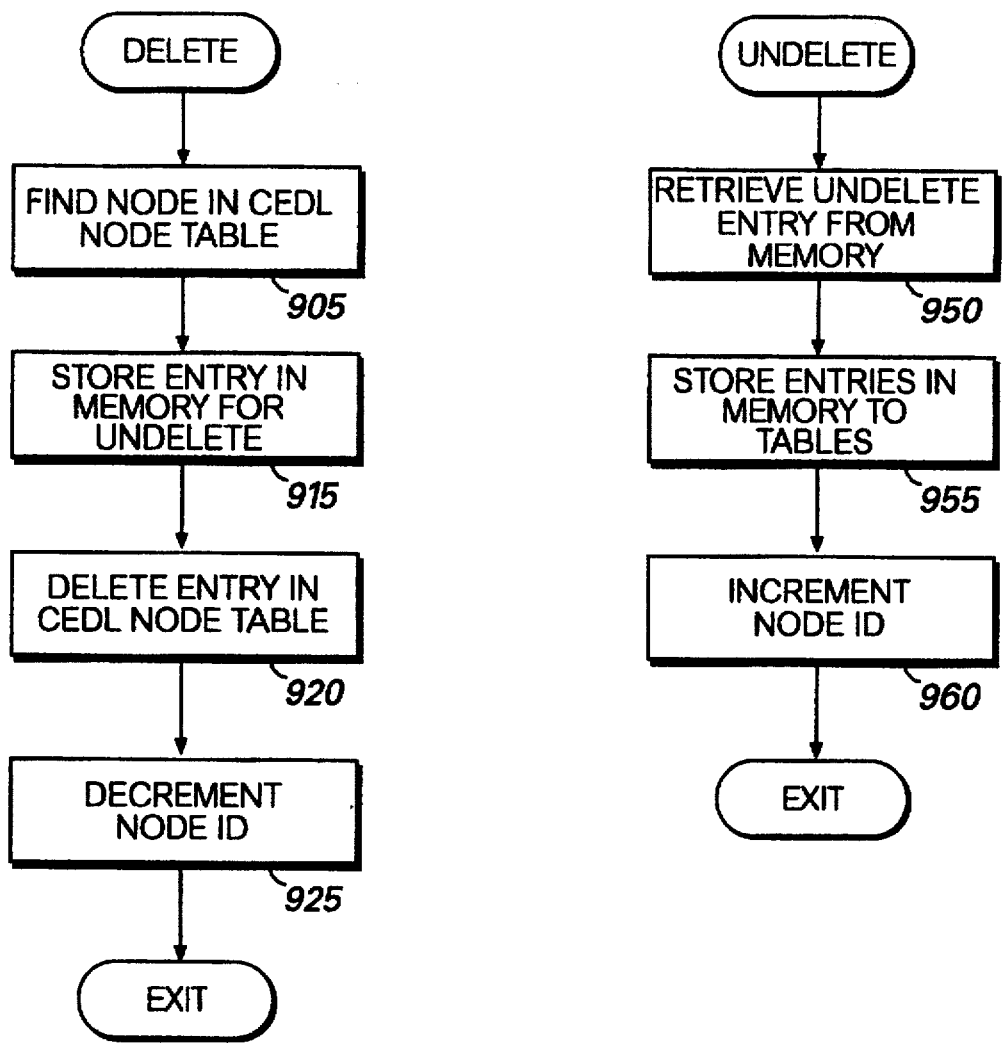
FIG. 9 is a flow diagram of a routine invoked to delete an external data link in accordance with the present invention.
FIG. 10 is a flow diagram of a routine invoked to undelete a previously-deleted external data link in accordance with the present invention.

The deletion of an external data connection is shown in FIG. 5 as routine 536. This routine is described in FIG. 9. The steps illustrated in FIG. 9 are carried out when a user issues a command that a selected external data link or connection is to be deleted, e.g. when the user decides to enter actual data in a spreadsheet cell as opposed to linking the data in from an external source. The delete operation presupposes that user has selected a cell in the PROJECT spreadsheet having an external data link.

Starting at step 905, the entry for the selected node associated with the external data link to be deleted is located in the CEDL Node Table 150. At step 915, data corresponding to the entry-to-be-deleted from the CEDL Node Table is stored in temporary "undelete" memory for purposes of implementing an undelete function. Then, at step 920, the corresponding entry in the CEDL Node Table is deleted. After deletion of the entry, the Node ID is decremented at step 925, to properly identify subsequent nodes in the CEDL Node Table. The method then exits.

The above steps effect the deletion of the entries in the appropriate data structures corresponding to the node to be deleted. However, if the user wishes to undelete a node associated with an external data connection, the user issues an undelete command. The undeletion of an external data connection is shown in FIG. 5 as routine 541. This routine is described in FIG. 10. The steps illustrated in FIG. 10 are carried out when a user issues a command that a selected external data link or connection is to be undeleted. The undelete operation presupposes that user has previously issued a delete command, and that data corresponding to the deleted entry from the CEDL Node Table 150 is stored in temporary undelete memory.

Starting at step 950, the CEDL Node Table entry deleted in a prior delete operation is retrieved from temporary undelete memory. At step 955, the data corresponding to the deleted entry is restored to the CEDL table, and if appropriate at step 960 the Node ID is incremented to reflect re-addition of the external data link node. The routine then exits.

Figure 11:
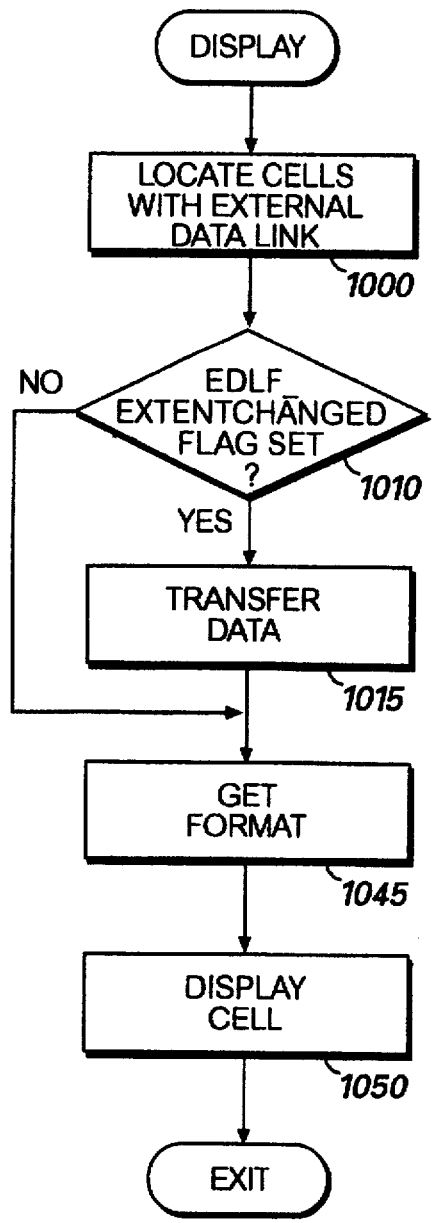
FIG. 11 is a flow diagram of a routine invoked to display a file in accordance with the invention.
Figure 12:
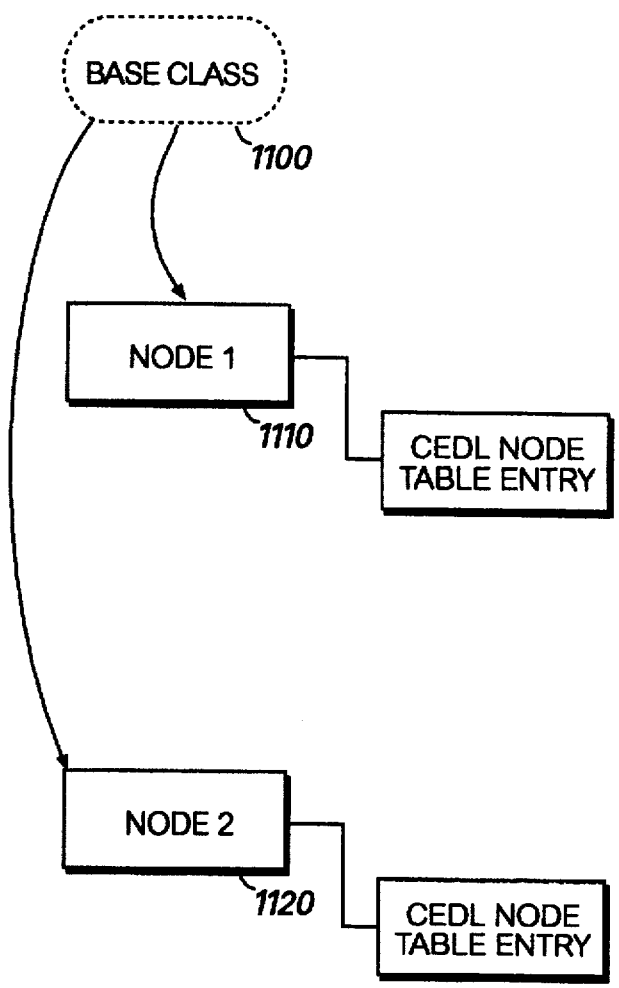
FIG. 12 illustrates a base class of objects for handling external data connections, with two exemplary nodes as instances of the base class.

When updated client data is to be displayed to the user on the display screen, the method shown in FIG. 11 is carried out. Those skilled in the art will understand that in most personal computer systems, hardware is provided for transferring data stored in a display memory to a display device such as CRT display monitor associated with the computer system. The display memory stores data corresponding to the actual image that is displayed. The computer application program is operative to keep the display memory loaded with data indicative of the operations of the computer system, so that when the display hardware transfers the display memory contents to the display device, the information will be displayed correctly and with appropriate formatting. Generally, the contents of the display memory are automatically transferred to the display device at a predetermined rate, e.g. 60 times a second, so that the display does not exhibit noticeable "flicker".

Those skilled in the art will also understand that the contents of the display memory are often altered or updated in response to user operations or other events, e.g. selecting a data cell and typing new contents, or resizing a window, or moving a window. Such operations are often called a "screen redraw event". Under certain predetermined conditions, a screen redraw event may call for updating external data links. For example, it is expressly contemplated that picture data that is linked into a client document via an external data link will be updated if the underlying picture in the server has been changed. Since picture data can be large and time-consuming to transfer, it is often desirable to update the picture from the server only in limited circumstances, e.g. in response to a screen redraw event.

For purposes of discussing FIG. 11, it is presupposed that a screen redraw event has occurred. Starting at step 1000, the CEDL Node Table 150 is traversed to locate any cells in the Task Information Table 120 that contain external data links. For each cell located, the flags are inspected to determine if the node is associated with any data that should be updated. As a specific example, the EDLF_EXTENTCHANGED flag implies that the underlying picture associated with the external data link has changed and should be redrawn.

At step 1010, the EDLF_EXTENTCHANGED flag is inspected for the selected node, and if set, the "yes" branch is taken to step 1015. If not, the "no" branch is taken to step 1045.

At step 1015, the picture associated with the external data link is retrieved (e.g. by transferring the picture data from the file indicated by the SOURCE field of the node to the cell indicated by the SINK field). In the example being described, the picture data would be stored in the Task Information Table 120 in association with corresponding row and field identifiers.

At step 1045, the proper format of the data in the Task Information Table to be displayed is obtained from a separate formatting table (not forming a part of the present invention). While formatting is not strictly application to picture data, those skilled in the art will understand that formatting (e.g. bold, italics, underlined, font, font size, etc.) is commonly applied to cell contents in a spreadsheet application, by imposing formatting information retrieved from a formatting table upon the data stored in cells of the Task Information Table. The contents of the cell are then displayed in the proper format at step 1050 by writing the formatted data to the computer's display memory.

From the foregoing, it will now be understood and appreciated that the base class of the present invention must be instantiated in order to include data members and function members defined by the base class. It should be understood that the creation of an instance of the base class comprises creation of an external data link node. Creation of the node comprises the generation of entries in the CEDL Node Table 150. Furthermore, the function calls associated with the base class listed in Table 1 are included in the instance of the base class.

Instantiation of the base class is demonstrated in FIG. 11. The base class, which it will be recalled does not exist in actual instances, is shown at 1100. The creation of each node associated with an external data connection is an instance of the base class. Each node has specific information regarding the external data connection maintained in several data structures. For example, Node 1, identified at 1110, has entries stored in the CEDL Node Table 150. This table, and the associated function calls associated with the node, comprise an instance. If the data transfer mechanism of Node 1 is OLE, then Node 1 is an instance of the CPL derived class, because CPL implements OLE client support. Another node, Node 2, identified at 1120, is a second instance. If the data transfer mechanism associated with Node 2 is DDE, then Node 2 is an instance of the CDDE derived class, because CDDE implements DDE client support.

Each of these different types of nodes, Node 1 and Node 2, will have corresponding different entries in the CEDL Node Table 150. Creation of a subsequent instance of the base class (e.g. creation of an additional external data link of a different type such as a cell in another document, or in another computer system) may cause the creation of an additional entry in the CEDL Node Table. Likewise, creation of a subsequent entry of the base class may merely cause modification to the data structures for an existing entry in the CEDL Node (e.g. creation of additional information in the SOURCE and SINK fields for a preexisting node) where there is already a node in existence in the CEDL Node Table of that particular type. Specifically, in the example given of the cell 131 in the EXCEL spreadsheet linked to the cell 104 in the PROJECT spreadsheet shown in FIG. 2B, there is no need to create a new entry in the CEDL Node Table if the user merely creates a new external data link for another PROJECT cell to another EXCEL cell. Rather, the node entry in the CEDL table corresponding to the EXCEL spreadsheet is modified so that the SOURCE and SINK field reflect the corresponding linked EXCEL file cell identifier and PROJECT cell row and field identifier.

In summary, the present invention provides a method and apparatus for creating a base class in an object-oriented computer programming environment that allows an application program to manipulate external data connections in a similar manner. The base class includes sufficient functionality for all external data connections regardless of the protocol of the data transfer mechanism that is utilized for the external data connection such that the specific function calls required from the application to implement each data transfer mechanism is hidden from the application. Thus, the application sees all external data connections as being similar because the application issues function calls only to the base class, thereby simplifying the programming required to allow the application to handle all external data connections.

From the foregoing, it will be appreciated that the preferred embodiment of the present invention overcomes the problems described hereinabove and accomplishes the previously stated objects of the present invention. From the description of the preferred embodiment equivalents of the elements shown therein will suggest themselves to those skilled in the art and way of constructing other embodiments of the present invention will suggest themselves to practitioners of the art. Therefore, the scope of the present invention is to be limited only by the claims below.

What is claimed is:

1. A method for transferring data between a first data region in a computer program application and a second data region in a computer program application, comprising the computer-implemented steps of:

defining said first data region;

identifying said first data region as containing linked data from an external data connection node, said external data connection node utilizing a predetermined one of a plurality of data transfer mechanisms;

in response to establishment of said external data connection node, creating at least one instance of a base class, said instance having associated data members and function members and corresponding to a predetermined first type of external data connection, said function members being common to each of the plurality of data transfer mechanisms;

defining said second data region and said linked data stored in said second data region;

identifying said second data region as providing linked data; and transferring the linked data from said second data region to said first data region by implementing said predetermined data transfer mechanism in response to the application program initiating the execution of corresponding functions associated with said instance of said base class;

wherein data corresponding to said external data connection node are stored as a set of predefined entries in a CEDL Node Table.

2. The method of claim 1 wherein said CEDL Node Table includes one set of entries for each external connection node.

3. The method of claim 1 wherein said entries include the name of the file in which said second data region is located.

4. The method of claim 3 wherein said entries include the location of said second data region within said file.

5. The method of claim 1 wherein said entries include the location of said first data region within a particular file.

6. The method of claim 1 wherein said entries include an identification tag for uniquely identifying said node.

7. The method of claim 1 wherein said entries include the status of said node.

8. The method of claim 1 wherein said entries include the type of data transfer mechanism associated with said node.

9. The method of claim 1 wherein said entries include the type of operating system supporting the application program in which said node is located.

10. The method of claim 1 wherein said CEDL Node Table includes a pointer between the entry in said CEDL Node Table identifying the location of said first data region and the actual location of said first data region.

11. The method of claim 1 wherein said second data region points to the entries of said node in said CEDL Node Table.

12. The method of claim 1 wherein said predetermined data transfer mechanism is DDE.

13. The method of claim 1 wherein said predetermined data transfer mechanism is OLE.

14. The method of claim 1 wherein said predetermined data transfer mechanism is Macintosh publisher.

15. The method of claim 1 wherein said predetermined data transfer mechanism is Macintosh subscriber.

16. The method of claim 1 wherein said first data region and said second data region are located within the same computer program application.

17. The method of claim 1 wherein said first data region and said second data region are located within different computer program applications.

18. The method of claim 1 wherein said first data region and said second data region are located within different computer program applications on different computer systems.

19. A computer-readable medium on which is stored a program for transferring data between a first data region in a computer program application and a second data region in a computer program application, the program comprising instructions which, when executed by the computer, perform the steps of:

defining said first data region;

identifying said first data region as containing linked data from an external data connection node, said external data connection node utilizing a predetermined one of a plurality of data transfer mechanisms;

in response to establishment of said external data connection node, creating at least one instance of a base class, said instance having associated data members and function members, said function members being common to each of the plurality of data transfer mechanisms;

defining said second data region and said linked data stored in said second data region;

identifying said second data region as providing linked data; and transferring the linked data from said second data region to said first data region by implementing said predetermined data transfer mechanism in response to the application program initiating the execution of corresponding functions associated with said instance of said base class;

wherein data corresponding to said external data connection node are stored as a set of predefined entries in a CEDL Node Table.

20. The medium of claim 19 wherein said CEDL Node Table includes one set of entries for each external connection node.

21. The medium of claim 19 wherein said entries include the name of the file in which said second data region is located.

22. The medium of claim 21 wherein said entries include the location of said second data region within said file.

23. The medium of claim 19 wherein said entries include the location of said first data region within a particular file.

24. The medium of claim 19 wherein said entries include an identification tag for uniquely identifying said node.

25. The medium of claim 19 wherein said entries include the status of said node.

26. The medium of claim 19 wherein said entries include the type of data transfer mechanism associated with said node.

27. The medium of claim 19 wherein said entries include the type of operating system supporting the application program in which said node is located.

28. The medium of claim 19 wherein said CEDL Node Table includes a pointer between the entry in said CEDL Node Table identifying the location of said first data region and the actual location of said first data region.

29. The medium of claim 19 wherein said second data region points to the entries of said node in said CEDL Node Table.

30. The medium of claim 19 wherein said first data region and said second data region are located within different computer program applications.

* * * * *